United States Patent [19]

Brankovics

[11] 4,317,330
[45] Mar. 2, 1982

[54] WATER TURBINE GENERATOR SYSTEM

[76] Inventor: Mihaly Brankovics, 3423 S. Yorktown Ave., Tulsa, Okla. 74105

[21] Appl. No.: 101,420

[22] Filed: Dec. 10, 1979

[51] Int. Cl.³ .......................... E02B 9/02; F03B 3/00; F03B 13/08
[52] U.S. Cl. ......................................... 60/398; 290/54; 405/75; 405/78; 415/72; 415/75
[58] Field of Search .................... 60/398, 325; 405/78, 405/75; 415/75, 71, 72, 8, 151, 155; 290/43, 54, 52

[56] References Cited

U.S. PATENT DOCUMENTS

| | | | |
|---|---|---|---|
| 873,845 | 12/1907 | Crow | 405/75 X |
| 921,687 | 5/1909 | Flynn | 405/75 |
| 1,071,748 | 9/1913 | Ingison | 405/75 X |
| 4,053,787 | 10/1977 | Diggs | 290/54 |
| 4,241,283 | 12/1980 | Storer, Jr. | 290/43 X |

FOREIGN PATENT DOCUMENTS 223384  10/1924  United Kingdom .................. 60/398

*Primary Examiner*—Irwin C. Cohen
*Attorney, Agent, or Firm*—James H. Chafin

[57] ABSTRACT

A water turbine generator system for use in a stream or river, said system having a catch basin formed by an end wall, a plurality of water chutes downstream of the catch basin and in communication with the catch basin by gates and closures and a plurality of turbines and associated generators journalled in the chutes for rotation by water passing therethrough. The turbines are provided with ribbon flight blades set at a pitch angle to maximize torque.

6 Claims, 8 Drawing Figures

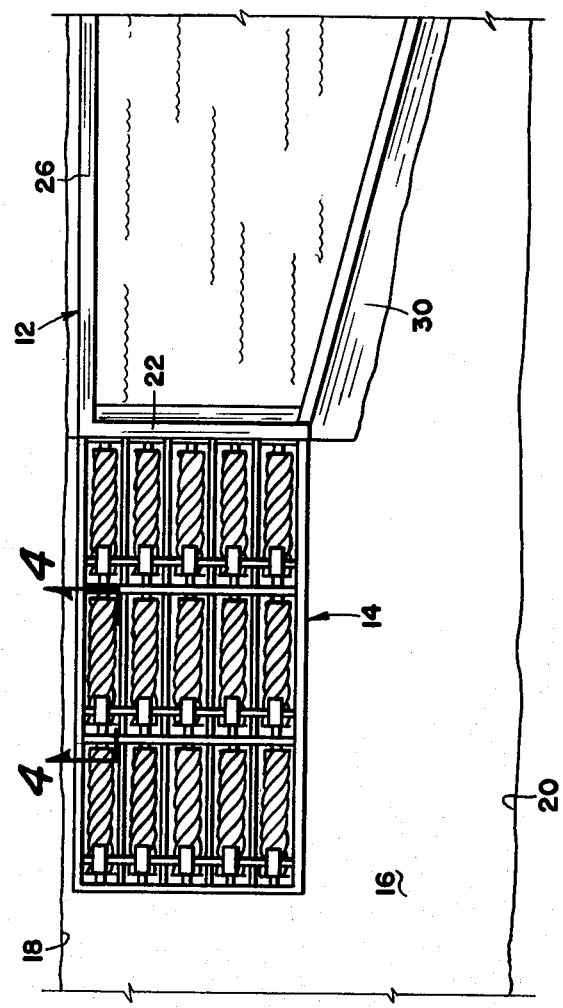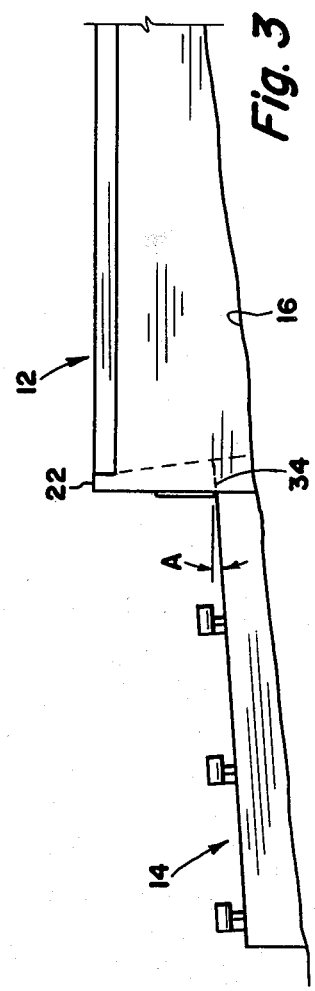

WATER TURBINE GENERATOR SYSTEM

BACKGROUND OF THE INVENTION

1. Field of the Invention

The present invention relates to power generators and more particularly, but not by way of limitation, to a water turbine generator system for use in rivers and streams.

2. History of the Prior Art

Hydro-electric and mechanical power generation is an old art and ranges from the simple water wheel of a grist mill to the giant hydro-electric dams.

The use of dams for the production of electrical energy is rather efficient since one of the primary purposes of the dam is that of flood control and the electrical energy generated by turbines located in the dam is more or less a by-product. However, it is difficult to rely on these rams for regular power generation since as stated, the dam is primarily used for flood control and if the need for releasing of water happens to coincide with the need for electrical power, then power is generated and the benefit is gained.

However, often when it is necessary to release water, there is no need for electrical energy and since there is no adequate way to generate the electrical energy and store it for further use, the benefit is lost.

Another important drawback in the building of a dam is that of creating a lake which causes a vast amount of land to be rendered useless except for recreation purposes.

The building of a dam on various scenic rivers has met with much opposition from the standpoint of ecology. However, many of these scenic rivers have a rather constant flow rate of water and as such are potentially very suitable for power generation.

Various water turbines have been devised for operating in streams such as that taught in the patents to Kunkel, U.S. Pat. No. 1,381,712, issued in 1921 for a "Water Motor" and the patent to Martin et al, U.S. Pat. No. 3,904,323, issued in 1975 for "Water Turbines And/Or Pumping Apparatus Incorporating Said Turbines". However, neither Kunkel or Martin et al teach the formation of a permanent structure which does not greatly distract from the aesthetics of a scenic river or stream and hence cannot be relied on as a constant reliable source of electrical energy produced by such streams and rivers.

SUMMARY OF THE INVENTION

The present invention provides a permanent structure that can be built along one bank of a river or stream and provides a catch basin to provide a more or less constant water head for the turbines. The catch basin lies totally within the stream or river so that the lake or water held in the catch basin does not extend beyond the banks of the stream and hence does not render any of the land around the stream unuseful.

The catch basin comprises an end wall that extends from one edge of the stream out into the bed of the stream but does not extend completely across the stream.

The height of the end wall would naturally depend on the desired water head but may typically be ten to fifteen feet high.

A first side wall is attached to the end wall and runs along the bank of the stream, the height of the side wall maintaining a constant elevation and extending upstream until it intersects with the stream bed at the same elevation as the top of the end wall. For instance, if the end wall is ten feet in height, the first side wall would extend along the contour of the stream edge until it intersects with the stream bed at that same elevation which may be a mile upstream depending on the rate of fall of the stream.

A second side wall extends from the outer end of the end wall and intersects the end wall at a elevation of possibly a foot or two below the height of the end wall. The second side wall then extends upstream and across the stream toward the opposite bank, the height of said side wall maintaining a constant elevation. The second side wall then extends upstream almost as far as that of the first side wall. Therefore, a catch basin is formed for holding water up to a level equal to the height of the second side wall. When the basin is filled and is not being emptied through the turbines, the water will flow over the second side wall much in the same way as a spillway to allow the stream to continue its course.

A plurality of parallel turbine chutes is connected to the downstream side of the end wall, each chute containing one or more turbines which are operably connected to a suitable electrical generator.

Each of the turbines consists of a rotating shaft, having a plurality of ribbon flight blades on the outer surface thereof. The inventor has found through experimentation that if the turbine chutes are set at an angle between approximately 3° to 7°, and the helical blades are set at an angle with respect to the longitudinal axis of the turbine shaft in the range of 28° to 35°, maximum torque is obtained by water flowing through the turbines.

Each of the turbines is connected to the interior of the basin through the end wall and may be selectively operated by raising and lowering closure members.

Further by utilizing several chutes in parallel, and multiple turbines within each chute, maintenance can be conducted on each turbine separately without significantly affecting the power generation.

DESCRIPTION OF THE DRAWINGS

Other and further advantageous features of the present invention will hereinafter more fully appear in connection with a detailed description of the drawings in which:

FIG. 2 is a top plan view of the system of FIG. 1.

FIG. 3 is a side elevational view of the system of FIG. 1.

DESCRIPTION OF THE PREFERRED EMBODIMENT

Figure 1:
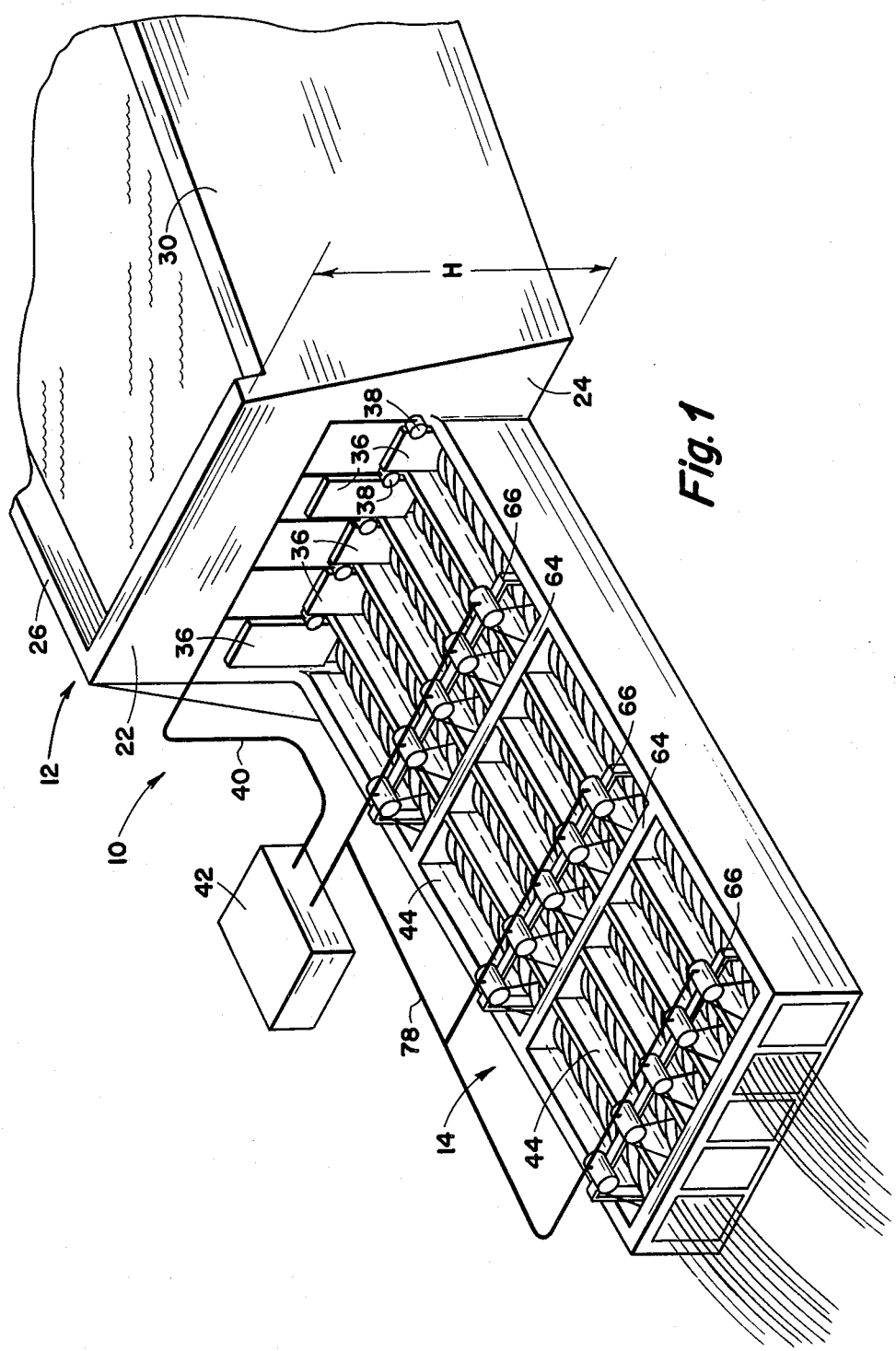
FIG. 1 is a perspective view of a water turbine generator system embodying the present invention.
Figure 4:
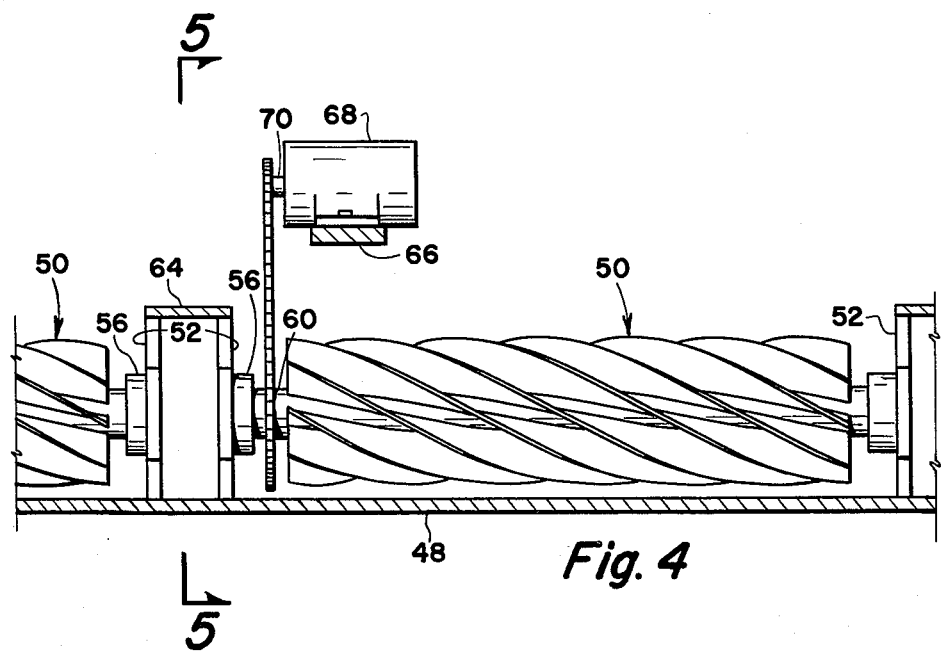
FIG. 4 is a side elevational sectional view of one section of the turbines taken along the broken lines 4—4 of FIG. 2.
Figure 5:
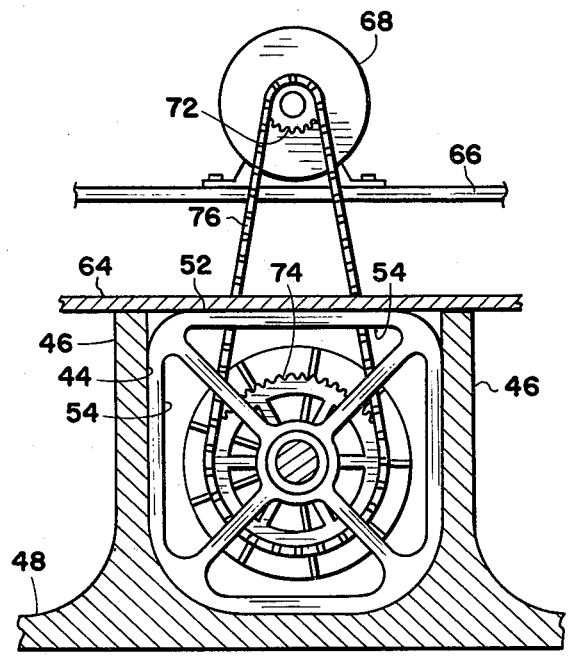
FIG. 5 is an end elevational sectional view taken along the broken lines 5—5 of FIG. 4.

Referring to the drawings in detail, reference character 10 generally indicates a water turbine generator system comprising a water basin generally indicated by reference character 12 and a series of turbine generator chutes generally indicated by reference character 14.

The turbine generator system is constructed in a river or stream bed indicated by reference character 16 of FIGS. 2 and 3, having opposite stream edges or banks 18 and 20.

The basin 12 comprises an end wall 22 which extends from one bank 18 of the stream transversely across part of the stream bed 16, the height of the end wall 22 being indicated by reference character H which typically might be in the range of 10 to 15 feet, usually dependent upon the longitudinal slope of the stream bed 16.

The lower end of the end wall 22 is thickened at reference character 24 in order to support heavier water pressures in the bottom of the basin 12.

The basin further comprises a first side wall 26 which extends along the bank 18 upstream of the end wall 22. The side wall 26 is configured to generally fit the contour of the bank 18.

The top surface of the side wall 26 is of the same elevation as the top of the end wall 22 and maintains the same elevation throughout its length upstream. It terminates at 28 in the stream bed 16 at a point where the stream bed 16 is of the same elevation as the top of the end wall 22.

For example, where the end wall is 10 feet high and the fall of the stream bed is 20 feet per mile, the side wall 26 might extend for a half mile upstream until the top surface thereof intersects the stream bed.

The first side wall 26 may also be tapered to be thicker at the bottom than at the top to compensate for pressure differences.

The basin 12 further comprises a second side wall 30 which attaches to the opposite end of the end wall 22 and extends upstream and across the stream bed. The top edge of the side wall 30 may be a foot or two lower in elevation than the top of the end wall and side wall 22 and 26. The purpose for the side wall 30 extending across the stream bed 16 is to gather the water into the basin to fill the basin to an elevation equal to the elevation of the top surface of the side wall 30.

Therefore, if water is flowing into the basin at a faster rate than it is being taken out through the turbine system 14, the water will uniformly spill over the side wall 30 of the basin and continue along the normal stream bed. Hence, after the basin has initially filled with water, there will be little interference of the flow of the stream either over the side walls 30 or through the turbine generator chutes 14.

The bottom end of the end wall 22 is provided with a plurality of openings 34 providing communication between the inside of the basin and the upstream end of the turbine generator chutes 14.

The upper end of the side wall 30 terminates at 32 at a point about where the elevation of the stream bed 16 is the same as the elevation at the top surface of the side wall 30.

The side wall 30 is also provided with a thickened base portion to compensate for higher pressures within the lower part of the basin.

A plurality of movable gate closure members 36 are slidably connected to the downstream surface of the end wall 32 in any suitable manner. There is one gate 36 provided for each aperture 34 associated with each chute of the plurality of chutes 14.

The gate members 36 may be manually operated or could be provided with control motors 38, each of which are connected by a suitable control line 40 to a control center 42. The control center 42 may be in the form of a switching box or a building housing the electrical control system.

The turbine generation chute assembly 14 comprises a plurality of longitudinal chutes 44 made up of longitudinal parallel side walls 46 and a floor 48. The inlet for each chute 44 is provided by the gates 34 and closure members 36 of the basin end wall 22. Each chute 44 is provided with a plurality of turbine wheels generally indicated by reference character 50. The chute assembly 14 is longitudinally inclinded by an angle A depicted in FIG. 3 and should be typically set between 3° and 7°.

Each turbine wheel 50 is rotatably supported by a plurality of spaced insert frames 52. The insert frames 52 are provided with apertures 54 therein to allow water to freely flow therethrough. Each insert frame 52 is provided with a support block 56 containing a suitable bearing 58 therein.

Figure 6:
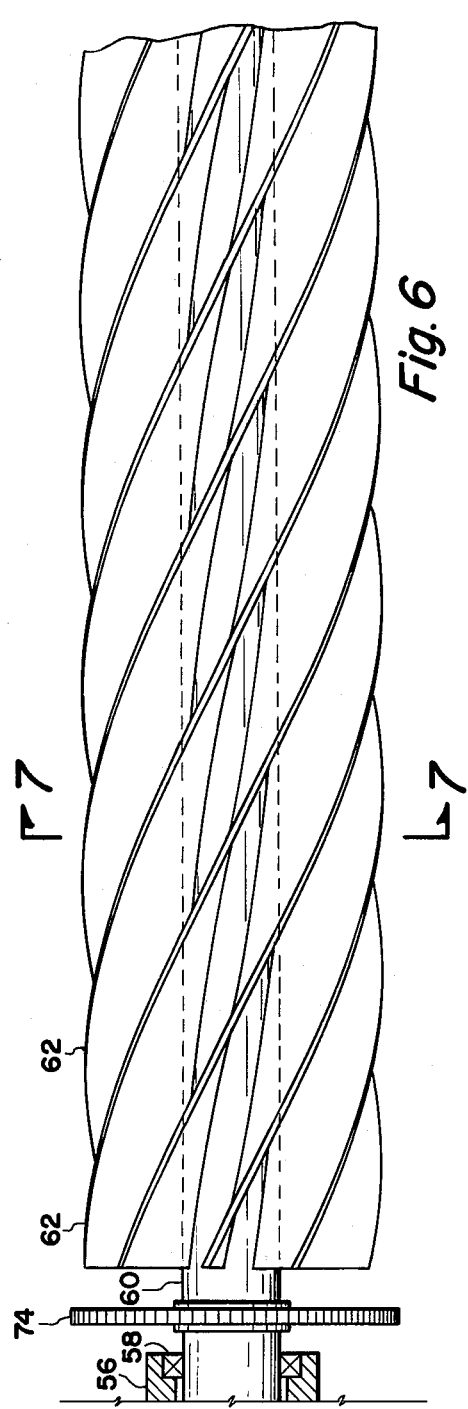
FIG. 6 is a detailed elevational view of one of the turbines.
Figure 8:
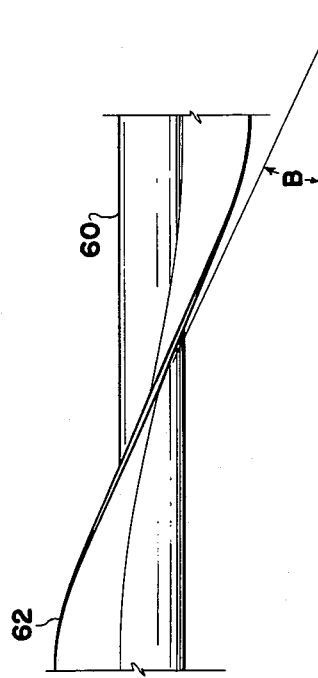
FIG. 8 is a detail of one of the ribbon flight blades of the turbine of FIG. 6.
Figure 7:
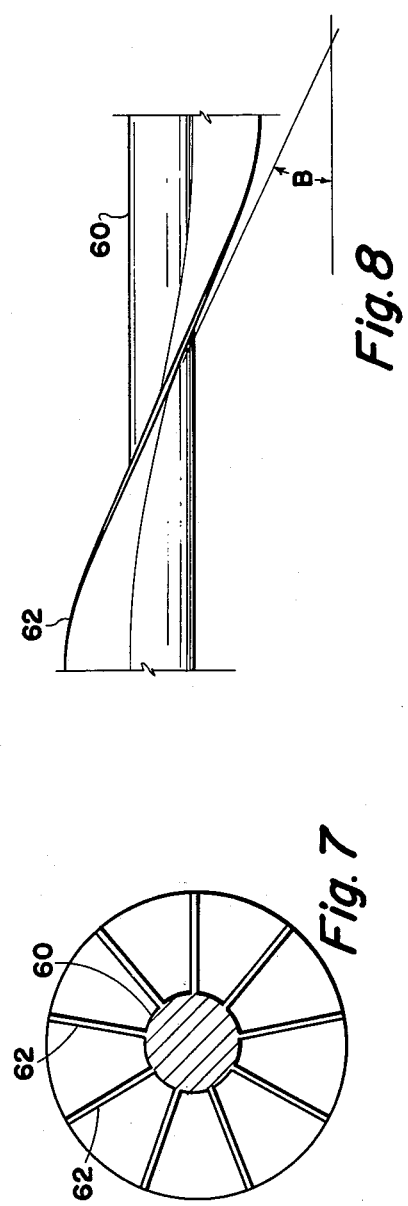
FIG. 7 is a sectional end view of one of the turbines taken along the broken lines 7—7 of FIG. 6.

Each turbine wheel 50 comprises an elongated central shaft 60. A plurality of ribbon flight blades 62 are secured around the shaft 60 in a helical pattern as shown in FIGS. 6 and 7 and are set at an angle with respect to the longitudinal axis of the shaft 60, said angle being identified by reference character B in FIG. 8 and is typically between 28° and 35°.

Experimentation has indicated that when the angle B is set at less than 28°, maximum torque is not achieved upon flowing water through the chutes. However, when the angle B of the blades 62 are set above 35°, turbulence is caused between the blades thereby reducing the effectiveness and the torque generated by the wheel.

However, when the incline of the chutes is set between 3° and 7° and the angle of the blades 62 is set between 28° and 35°, laminar flow of the water occurs through the blades providing maximum torque of the turbine wheel 50.

Between each set of adjacent insert frames 52 there is a top board member 64 which can be used as a walkway to service the various components associated with the turbine generator chute assembly 14.

The chute assembly 14 further comprises a super structure frame work 66 adjacent the downstream ends of each turbine wheel 50 for supporting a suitable generator 68. Each generator 68 is provided with a shaft member 70 which is operably connected to the turbine wheel shaft 60 by means of a pair of sprocket wheels 72 and 74 and a connecting endless chain 76. The electrical output of each of the generators 68 then is transmitted to the control unit 42 by a plurality of suitable cables indicated by reference character 78.

In operation, water is collected in the basin 12 and can rise in the basin 12 until it reaches the elevation of the top surface of the side wall 30 wherein it will start to spill over the side.

A selective number of gate closure members 36 may be raised as shown in FIG. 1 wherein the first and fourth gates are in a raised position thereby allowing water to flow through the first and fourth longitudinal turbine generator chutes. This will permit the turbine wheels 50 within those chutes to be totally submerged in the water. The flow of water through the helical turbines blades 62 will cause the turbines to rotate, said rotation being transferred to the generators 68 by means of the sprocket wheels 72 and 74 and the chain 76.

The length of the turbine wheels are a matter of engineering design, the greater the wheel length, the greater the torque. However, in the interest of maintenance, the inventor feels that the length of the turbine wheels should be no more than approximately 10 feet so that they may be easily handled and maintained without shutting down the entire chute and with a minimal amount of equipment.

In times when no electrical generation is needed, the water is allowed to freely flow over the side wall 30 of the basin and continue down the bed of the stream.

From the foregoing, it can be seen that the present invention provides a system for the generation of electrical power in a stream or river without altering the course of the river or without building up a lake, rendering the surrounding land useless. Although the aesthetic value of the river site may be somewhat disturbed, it is felt such disturbance is held at a minimum while allowing the river to stay within its banks. The narrow lake constructed in the stream bed would have recreational uses.

Whereas, the present invention has been described in relation to the drawings attached hereto, other and further modifications apart from those shown or suggested herein may be made within the spirit and scope of the invention.

What is claimed is:

1. A water turbine generator system for use in streams and rivers comprising:
   (a) a water holding basin positionable in a stream or river bed at one edge of the stream or river, said basin comprising an end wall of height H, a first side wall connected to the end wall and extending upstream along said stream edge, the upper surface of said first side wall maintaining a first constant elevation, a second side wall connected to the end wall and having a height of less than H adjacent said end wall and extending upstream and across stream, the upper surface of said second side wall maintaining a second constant elevation;
   (b) a plurality of elongated water chutes longitudinally disposed in the stream bed downstream of the basin end wall, the upper ends thereof operably connected to the base of said end wall, each said chute being inclined with respect to the horizontal by an amount of 3° to 7°;
   (c) at least one rotary turbine journalled in each chute, a generator operably connected to each said turbine, each said rotary turbine comprising an elongated shaft journalled in the chute parallel to said inclined chute and having a plurality of ribbon flight blades secured to the shaft in a helical pattern, the angle of said blades with respect to the longitudinal axis of said shaft being between 28° and 35°; and
   (d) a gate and movable closure member disposed between the base of the basin end wall and the upper end of each chute to provide selective flow of water from the basin through the chute for rotation of said turbine.

2. A water turbine generator system as set forth in claim 1 wherein the upstream end of the first side wall intersects the stream bed at said first constant elevation and the upstream end of said second side wall intercepts the stream bed at said second constant elevation.

3. A water turbine generator system as set forth in claim 1 wherein the basin end wall and side walls are thicker at the bottom than at the top.

4. A water turbine generator system as set forth in claim 1 wherein the movable closures comprise vertically slidable panels and means to selectively and separately open and close said closure members.

5. A water turbine generator system as set forth in claim 1 wherein the turbine shaft is provided with a first gear member, the generator being provided with a second gear member and an endless chain connecting said first and second gear members.

6. A water turbine generator system as set forth in claim 1 wherein each chute contains three turbines in series, each turbine being separately journalled within the chute.

* * * * *